United States Patent [19]

Gawne

[11] Patent Number: 4,815,678

[45] Date of Patent: Mar. 28, 1989

[54] PIVOTALLY MOUNTED HIGH ENERGY ABSORBING AIRCRAFT TAIL SKID ASSEMBLY HAVING PREDETERMINED FAILURE MODE

[75] Inventor: Dennis M. Gawne, Kirkland, Wash.

[73] Assignee: The Boeing Company, Seattle, Wash.

[21] Appl. No.: 129,021

[22] Filed: Dec. 4, 1987

[51] Int. Cl.$^4$ .............................................. B64C 25/32
[52] U.S. Cl. ...................................... 244/109; 74/585; 244/100 R
[58] Field of Search .................... 244/138 R, 108, 109, 244/100 R; 188/377, 376, 5; 74/581, 585, 492

[56] References Cited

U.S. PATENT DOCUMENTS

| | | | |
|---|---|---|---|
| 3,228,492 | 1/1966 | Blumrich | 244/138 R |
| 3,252,548 | 5/1966 | Pajak et al. | 188/377 |
| 3,265,163 | 8/1966 | Gilbert et al. | 188/377 |
| 3,295,798 | 1/1967 | Hopping | 188/377 |
| 3,493,082 | 2/1970 | Bell | 244/138 R |
| 3,759,351 | 9/1973 | Purple | 188/377 |
| 4,087,062 | 5/1978 | Masilet | 188/376 |
| 4,426,109 | 1/1984 | Fike, Jr. | 188/376 |

Primary Examiner—Galen Barefoot
Attorney, Agent, or Firm—Conrad O. Gardner; B. A. Donahue

[57] ABSTRACT

A high energy absorbing aircraft tail skid assembly for protecting an aircraft fuselage lower skin portion from damage in the event of a tail strike due to over rotation on take-off of the aircraft. The high energy absorbing tail skid assembly is pivotally mounted to the aircraft bulkhead, and comprises a telescoping rod assembly including a crushable aluminum cartridge, positioned coaxially with respect to the central axis of the telescoping rods. The telescoping rod is coupled through linkage, including a fuse pin providing a predetermined failure mode for the high energy aircraft tail skid assembly, to prevent overloading critical aircraft structure.

1 Claim, 4 Drawing Sheets

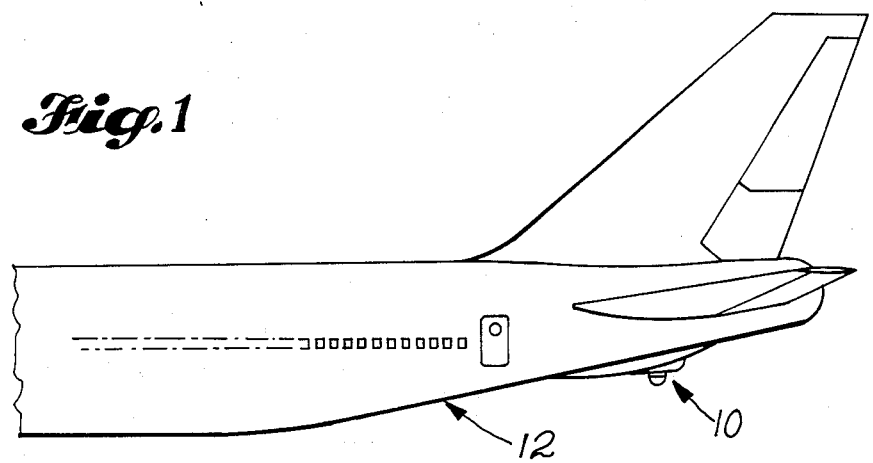
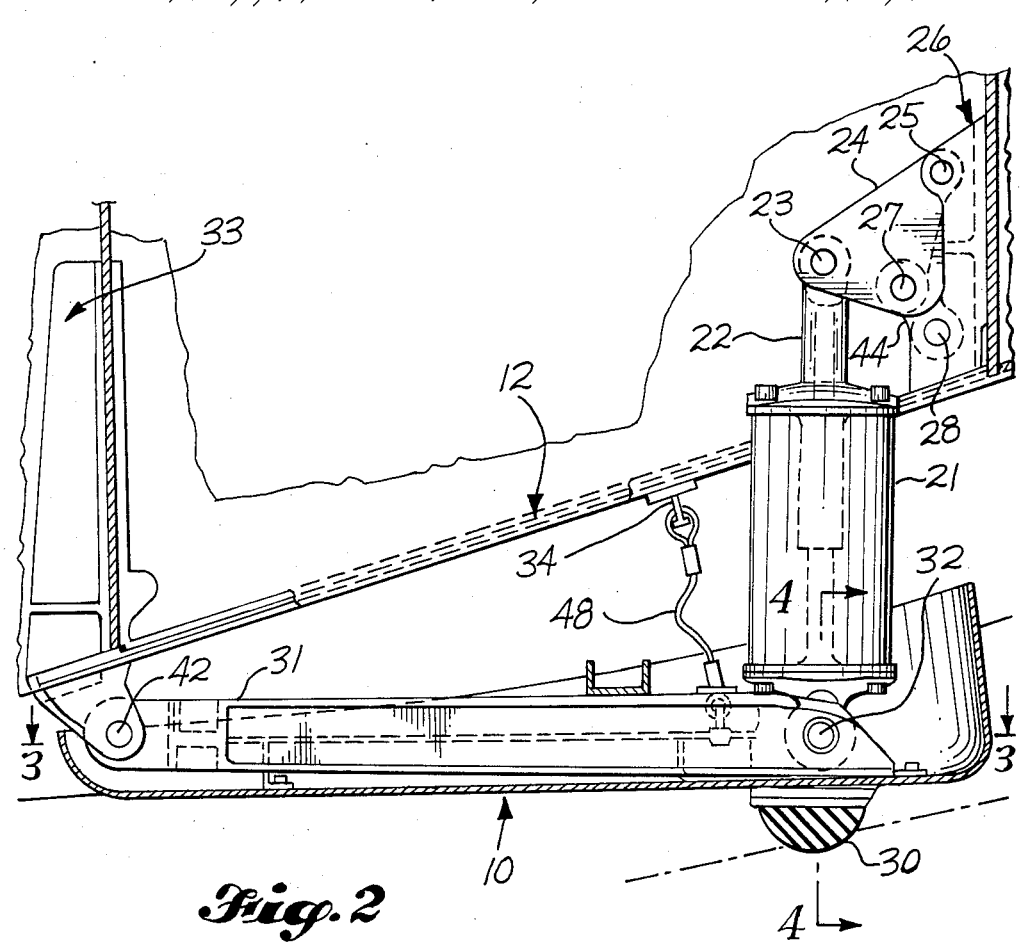

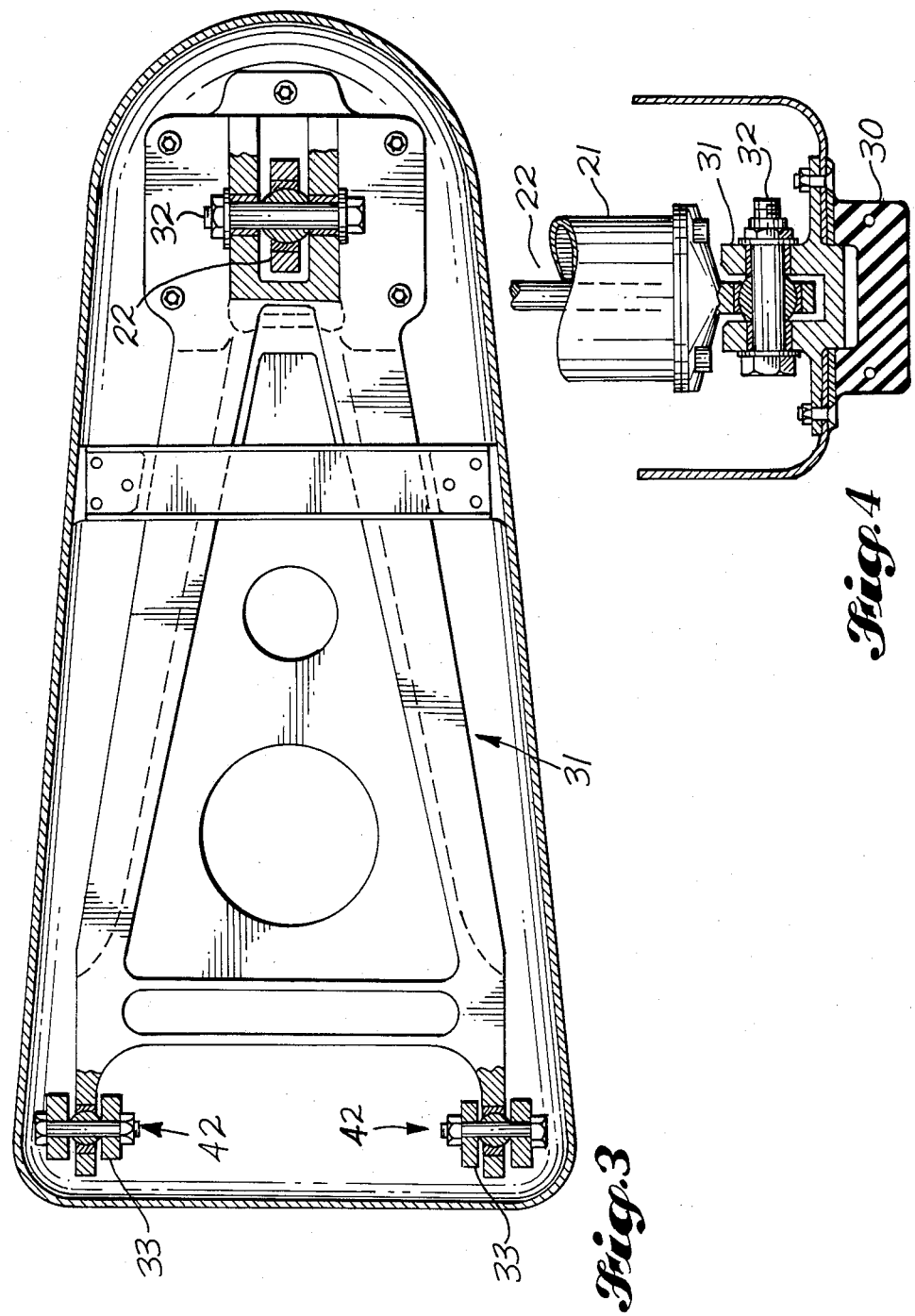

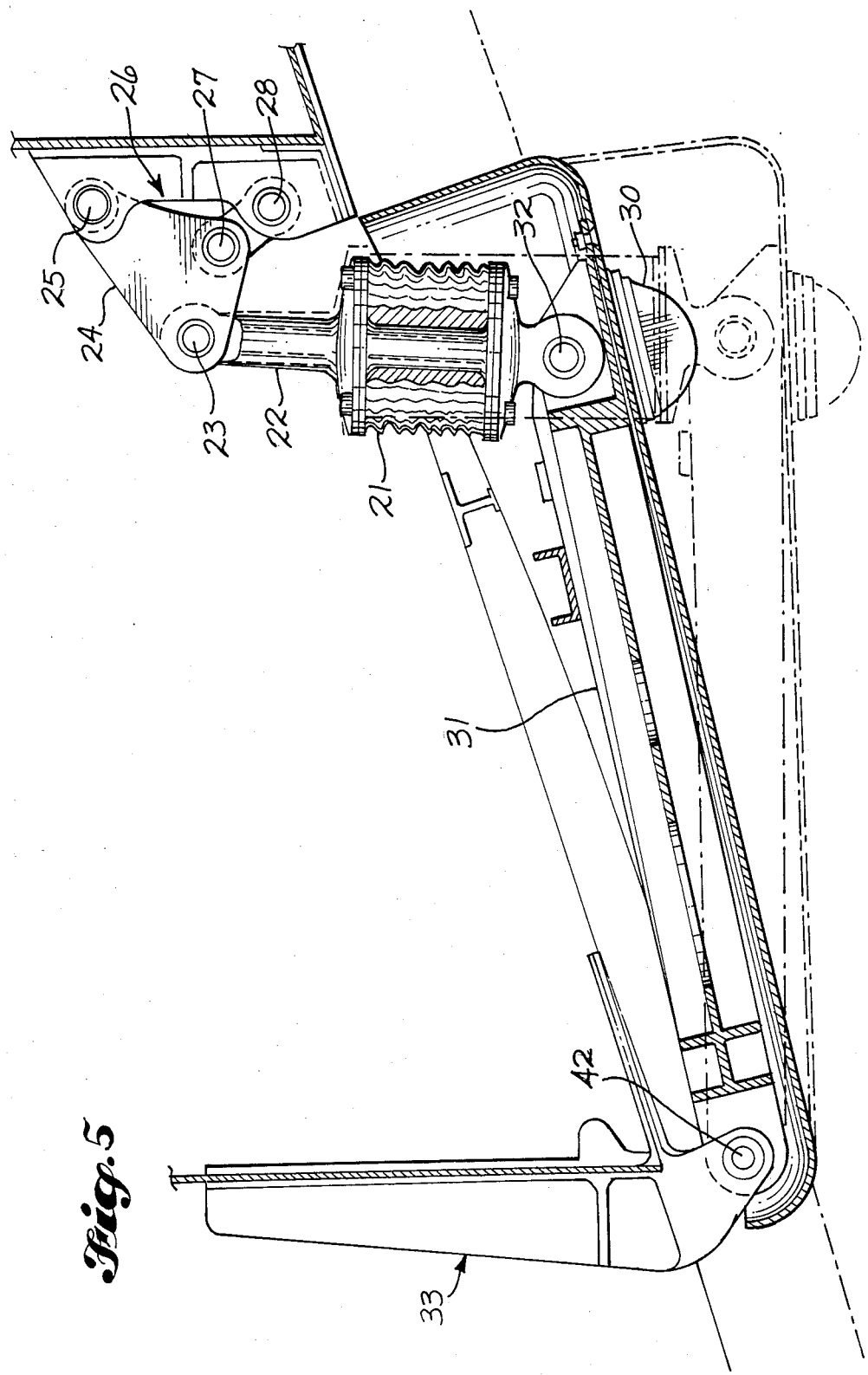

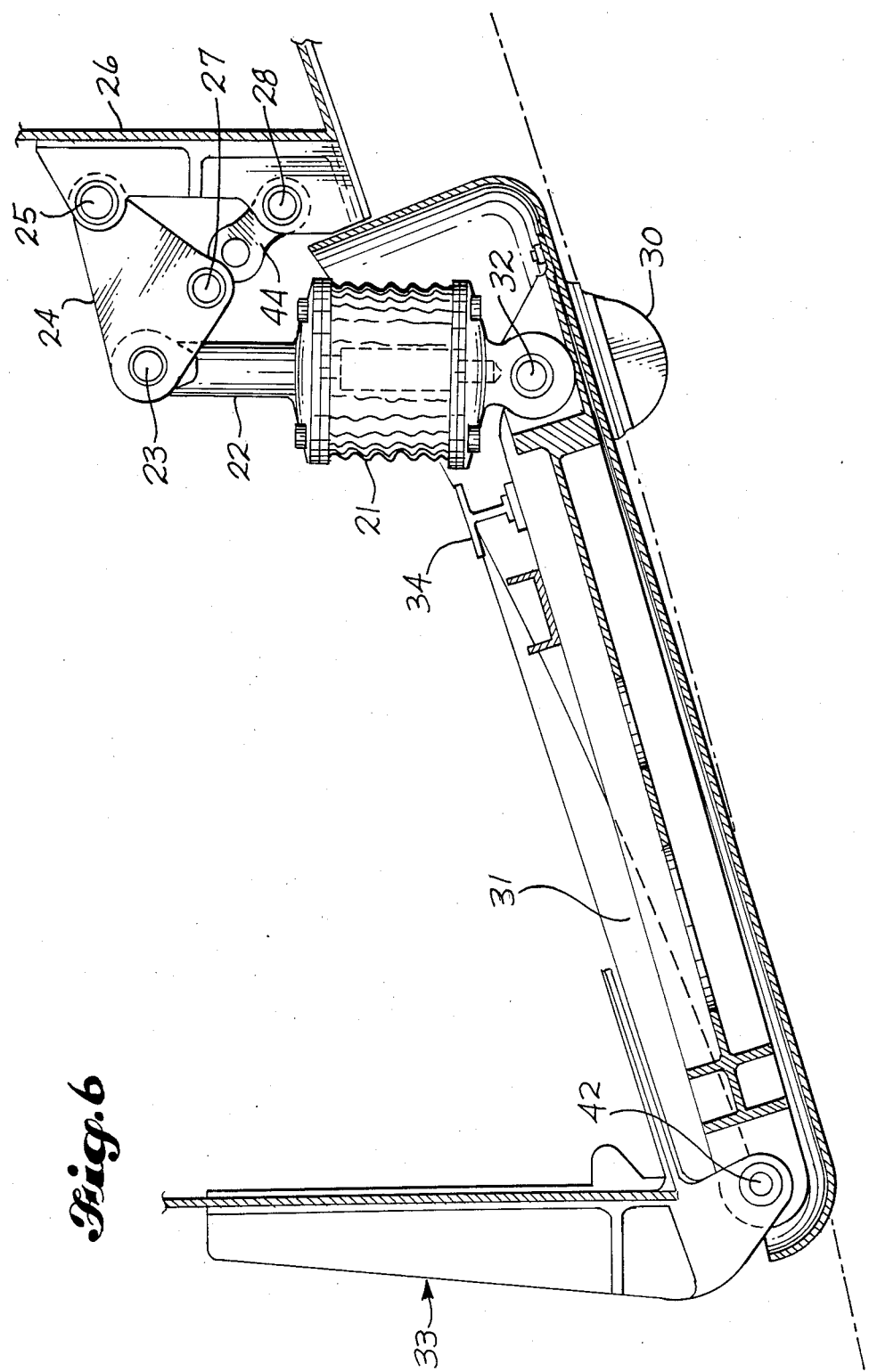

PIVOTALLY MOUNTED HIGH ENERGY ABSORBING AIRCRAFT TAIL SKID ASSEMBLY HAVING PREDETERMINED FAILURE MODE

BACKGROUND OF THE INVENTION

The present invention relates to aircraft tail skid assemblies and more particularly to a high energy absorbing tail skid assembly having a predetermined failure mode.

Crushable energy absorbers are well documented in the prior art as shown for example in U.S. Pat. Nos. 3,130,819; 3,228,492; 3,252,548; 3,265,163; 3,295,798; 3,493,082; and 3,664,463. A crushable energy absorber has been shown in an airplane tail wheel as shown in U.S. Pat. No. 3,130,819. The use of a crushable energy absorber for the purpose of directly protecting an aircraft fuselage is shown in U.S. Pat. No. 3,252,548 and U.S. Pat. No. 3,493,082 shows such use with an airplane tail skid.

In contrast to the aforementioned exemplary prior art, the subject tail skid assembly includes the following: a fuse pin, a fuse link, a pivot link, a drag link and an aluminum crushable cartridge mounted to a telescoping rod assembly.

A tail strike of a magnitude less than the predetermined crush load of the crushable cartridge, has no effect on the tail skid assembly, except possibly a slight wear mark on the tail skid shoe.

In the advent of a tail strike of a magnitude in excess of the designed total capacity of the crushable cartridge the mounting linkage remains rigid, until the load on the fuse pin 27 exceeds its predetermined shear load, at which time the fuse pin 27 will shear thereby precluding damage to the basic aircraft structure 12.

Once the fuse pin 27 has sheared, the pivot link 24 is then free to rotate, which allows the drag link 31 to rotate up until it bottoms out against the stop provided by 34.

The pivot link 24 is designed to rotate up and aft, which prevents damage to the flight control system in the advent of the telescoping rods 22 and crushable cartridge 21 failing to collapse.

Accordingly it is an object of the present invention, to provide a pivotally mounted high energy absorbing aircraft tail skid assembly, which has a predetermined failure mode. It is yet a further object of the present invention, to provide a visual inspection after a tail strike, of the present pivotally mounted high energy absorbing aircraft tail skid assembly, by observation of a metered decal from the ground.

A preferred embodiment of the present pivotally mounted high energy absorbing aircraft tail skid assembly is illustrated in the accompanying drawings wherein:

BRIEF DESCRIPTION OF THE DRAWINGS

FIG. 1 is a side view of a preferred embodiment of the present pivotally mounted high energy absorbing tail skid assembly showing general location thereof;

FIG. 2 is a sectional side view taken through the present fuselage mounted tail skid assembly shown in FIG. 1;

FIG. 3 is a sectional view taken along the lines 3—3 of FIG. 2 showing pivotal mounting hardware of the present tail skid assembly;

FIG. 4 is a sectional view taken along the lines 4—4 of FIG. 2 showing the mounting hardware between the telescoping rods and the drag link, and the drag link and the shoe;

FIG. 5 is a sectional view similar to FIG. 2, however showing the configuration when the aluminum cartridge is fully crushed from the initial position subsequent to impact of skid surface and ground; and, FIG. 6 shows as in FIG. 5 the collapse of the crushable aluminum cartridge prior to linkage fuse pin break thereby providing a full deployment of the crushable aluminum cartridge in a predictable predetermined failure mode.

DESCRIPTION OF THE PREFERRED EMBODIMENTS

Turning now to FIG. 1 there is shown a pivotally mounted high energy absorbing aircraft tail skid assembly 10 in accordance with a preferred embodiment of the present invention which is mounted on the bulkhead at the rear of the fuselage of the aircraft 12. In FIG. 2 the present pivotally mounted high energy absorbing aircraft tail skid assembly 10, is seen to include a cylindrical aluminum crushable cartridge 21, mounted on telescoping rods 22. Telescoping rod 22 is pivotally connected at 23 to a pivot link 24.

Pivot link 24 is also connected by the fuse pin 27 to the fuse link 44, and by pin 25 to bulkhead support fitting 26.

Fuse link 44 is pivotally connected at 28 to the fixed bulkhead support fitting 26.

The crushable cartridge 21 is mounted in the telescoping rods 22, and the lower end is pivotally connected at 32 to the drag link 31.

The drag link 31 is pivotally connected at 42 to the drag link support fittings 33, which are permanently mounted to aircraft fuselage 12. The tail skid shoe 30 is bolted to the lower aft surface of the drag link 31.

FIG. 5 shows the result of a tail strike of a magnitude equal to but less than the ultimate shear value of the shear pin 27.

FIG. 6 shows the result of a tail strike of a magnitude greater than the shear value of the shear pin 27.

A restraining lanyard 48 (shown on FIG. 2) is secured to the aircraft fuselage 12 and to the drag link 31. This serves several purposes—(it supports the drag link during cartridge replacement)—mainly it is a human safety factor during maintenance if either bolts 23 or 32 are removed—or damage to aircraft structure, also allows the system to be serviced by a single person.

What is claimed is:

1. An aircraft tail skid assembly (10) comprising in combination:
    a crushable energy absorbing aluminum cartridge (21);
    telescoping rods (22) for mounting said crushable energy absorbing aluminum cartridge (21), said telescoping rods (22) having an upper end portion coupled to bulkhead support structure (26) disposed within the aircraft fuselage (12);
    a skid shoe (30);
    a drag link (31) coupled between the lower surface of said aircraft fuselage (12) and said skid shoe (30);
    said drag link (31) and said skid shoe (30) also coupled to the lower end of said telescoping rods (22);
    said aircraft tail skid assembly (10) further including aircraft structure (12) protection means comprising a fuse pin (27) connecting a pivot link (24) to a fuse link (44);

said fuse pin (27) when sheared permitting said pivot link (24) to rotate thereby allowing said drag link (31) to rotate up until bottoming out against a stop (34); and, wherein said crushable energy absorbing aluminum cartridge (21) collapses prior to fuse pin (27) breaking thereby providing full deployment of said crushable energy absorbing aluminum cartridge (21) in a predictable predetermined failure mode.

* * * * *